United States Patent
Zou et al.

(10) Patent No.: US 12,374,943 B2
(45) Date of Patent: Jul. 29, 2025

(54) ROTATING ELECTRICAL MACHINE

(71) Applicant: SHANGHAI VALEO AUTOMOTIVE ELECTRICAL SYSTEMS CO., LTD., Shanghai (CN)

(72) Inventors: Yiming Zou, Shanghai (CN); Yingpeng Zhang, Shanghai (CN); Jiawen Chu, Shanghai (CN); Guanghui Xu, Shanghai (CN); Tao Yang, Shanghai (CN)

(73) Assignee: SHANGHAI VALEO AUTOMOTIVE ELECTRICAL SYSTEMS CO., LTD., Shanghai (CN)

(*) Notice: Subject to any disclaimer, the term of this patent is extended or adjusted under 35 U.S.C. 154(b) by 275 days.

(21) Appl. No.: 18/006,104

(22) PCT Filed: Jul. 29, 2021

(86) PCT No.: PCT/CN2021/109238
§ 371 (c)(1),
(2) Date: Jan. 19, 2023

(87) PCT Pub. No.: WO2022/022638
PCT Pub. Date: Feb. 3, 2022

(65) Prior Publication Data
US 2023/0352996 A1 Nov. 2, 2023

(30) Foreign Application Priority Data

Jul. 29, 2020 (CN) .......................... 202010743615.9
Jul. 29, 2020 (CN) .......................... 202021530554.X

(51) Int. Cl.
H02K 1/24 (2006.01)
H02K 1/2713 (2022.01)

(52) U.S. Cl.
CPC .......... *H02K 1/243* (2013.01); *H02K 2213/03* (2013.01)

(58) Field of Classification Search
CPC ...... H02K 1/243; H02K 1/2713; H02K 1/145; H02K 1/24; H02K 1/22; H02K 21/044;
(Continued)

(56) References Cited

U.S. PATENT DOCUMENTS 5,270,605 A * 12/1993 Lefrancois ............. H02K 1/243
310/263
6,059,969 A * 5/2000 Mizutani ................. H02K 3/12
310/407
(Continued)

FOREIGN PATENT DOCUMENTS

CN 201918854 U * 8/2011
CN 206 673 802 U 11/2017
(Continued)

OTHER PUBLICATIONS

International Search Report issued Nov. 30, 2021 in PCT/CN2021/109238 filed on Jul. 29, 2021, 3 pages.

Primary Examiner — Edgardo San Martin
(74) Attorney, Agent, or Firm — Oblon, McClelland, Maier & Neustadt, L.L.P.

(57) ABSTRACT

The embodiments of the present invention disclose a rotating electrical machine. The rotating electrical machine comprises a stator and a rotor, the rotor comprises a rotating shaft and magnetic poles fixed to the rotating shaft, a chamfer being provided on the radial outer surface of at least one of the magnetic poles; the stator comprises a stator core, the stator core being located on one side of the magnetic poles far from the rotating shaft, the chamfer overlapping with the stator core in the axial direction of the rotor. For the rotating electrical machine provided by the embodiments of the present invention, the harmonic reluctance is changed by (Continued)

providing a chamfer on the radial outer surface of the magnetic poles of the rotor and allowing the chamfer to at least partially overlap with the stator core in the direction of the rotor shaft, which reduces the resultant air gap field of the motor and thus the electromagnetic force of the motor, achieving the objective of reducing electromagnetic noise and improving user experience.

12 Claims, 6 Drawing Sheets

(58) Field of Classification Search
CPC ............. H02K 21/048; H02K 2213/03; H02K 2201/06
See application file for complete search history.

(56) References Cited

U.S. PATENT DOCUMENTS

| | | | | |
|---|---|---|---|---|
| 6,700,296 | B1 * | 3/2004 | Oohashi | H02K 1/243 |
| | | | | 310/263 |
| 6,903,485 | B2 * | 6/2005 | Chen | H02K 21/044 |
| | | | | 310/263 |
| 7,679,259 | B2 * | 3/2010 | Lutz | H02K 1/243 |
| | | | | 310/263 |
| 7,701,109 | B2 * | 4/2010 | Ishikawa | H02K 1/243 |
| | | | | 310/263 |
| 7,759,837 | B2 * | 7/2010 | Ishikawa | H02K 1/243 |
| | | | | 310/263 |
| 9,755,464 | B2 * | 9/2017 | Sekiyama | H02K 1/243 |
| 10,069,355 | B2 * | 9/2018 | Gautru | H02K 1/243 |
| 10,158,264 | B2 * | 12/2018 | Kudou | H02K 1/243 |
| 2004/0232799 | A1 | 11/2004 | Chen et al. | |
| 2008/0136272 | A1 | 6/2008 | Ishikawa et al. | |
| 2014/0175939 | A1 | 6/2014 | Sekiyama et al. | |
| 2016/0336821 | A1 | 11/2016 | Kudou | |
| 2016/0359383 | A1 | 12/2016 | Gautru et al. | |

FOREIGN PATENT DOCUMENTS

| | | | | | |
|---|---|---|---|---|---|
| CN | 212323828 | U | * | 1/2021 | ............. H02K 1/145 |
| CN | 113708526 | A | * | 11/2021 | |
| EP | 3 104 501 | A1 | | 12/2016 | |
| FR | 3044482 | A1 | * | 6/2017 | ........... H02K 21/044 |
| FR | 3103331 | A1 | * | 5/2021 | ............. H02K 1/243 |
| JP | 4887128 | B2 | * | 2/2012 | ............. H02K 1/145 |
| WO | WO-2012059981 | A1 | * | 5/2012 | ............. H02K 1/243 |
| WO | WO-2017093634 | A1 | * | 6/2017 | ............. H02K 1/243 |

* cited by examiner

ROTATING ELECTRICAL MACHINE

FIELD

The embodiments of the present invention relate to electrical machine technology and, more particularly, to a rotating electrical machine.

BACKGROUND

With the development and application of automotive technology, customers' requirements for automotive NVH (noise, vibration and harshness) and output performance are getting higher and higher, the sound of motors is getting quieter and quieter, and OEMs are getting more and more demanding in terms of noise and output performance of automotive motors.

Vibration caused by electromagnetic force in the operation process of motors propagates to the surrounding space through the motor body, causing vibration of mass points in the air and generating sound waves. When a sound wave has a frequency of 20 H to 20 kHz, it can be heard by human ears. This is electromagnetic noise.

In related technologies, motors generate significant electromagnetic noise in the operation process due to the structural effect of motors, affecting user experience. In addition, motor noise is improved by reducing the area of the radial outer surface of the rotor pole claws of motors. When the area of the radial outer surface of the rotor pole claws is reduced to a certain degree, the magnetic circuit reluctance of motors will be increased, causing reduced motor output performance.

SUMMARY OF THE INVENTION

The embodiments of the present invention provide a rotating electrical machine to reduce the electromagnetic noise of the electrical machine and to improve the output performance of the electrical machine.

The embodiments of the present invention provide a rotating electrical machine, comprising a stator and a rotor; the rotor comprises a rotating shaft and magnetic poles fixed to the rotating shaft, a chamfer being provided on the radial outer surface of at least one of the magnetic poles; the stator comprises a stator core, the stator core being located on one side of the magnetic poles far from the rotating shaft, the chamfer overlapping with the stator core in the axial direction of the rotor.

In one embodiment, the magnetic poles comprise at least one pole claw, a chamfering part being provided on the outer surface of the at least one pole claw, the chamfering part forming the at least one chamfer.

In one embodiment, the chamfering part is a cambered surface or a smooth surface with a preset angle.

In one embodiment, the number of the magnetic poles is two; the chamfer is provided on all the pole claws of the two magnetic poles; alternatively, the chamfer is provided on all the pole claws of the one magnetic pole; alternatively, the chamfer is provided on some of the respective pole claws of the two magnetic poles; alternatively, the chamfer is provided on some of the pole claws of the one magnetic pole.

In one embodiment, the at least one pole claw has one chamfer, the one chamfer being a first chamfer, the first chamfer being located at the root of the pole claw.

In one embodiment, the at least one pole claw has two chamfers which are respectively a first chamfer and a second chamfer, wherein the second chamfer is located at the root of the pole claw; the first chamfer is located at the middle or tip of the pole claw and overlaps with the stator core in the axial direction of the rotor.

In one embodiment, the first chamfer joins the second chamfer; alternatively, the first chamfer and the second chamfer have a cambered transition part.

In one embodiment, the overlapping length of the first chamfer with the stator core in the axial direction satisfies the following relation:

$$0.01 \le L2/L1 \le 0.3 \tag{1}$$

where L1 is the length of the stator core; L2 is the overlapping length of the first chamfer with the stator core.

In one embodiment, a preset included angle exists between the first chamfer and the stator core and satisfies the following relation:

$$1° \le \alpha 1 \le 30° \tag{2}$$

where α1 is the preset included angle between the first chamfer and the stator core.

In one embodiment, the rotor further comprises an excitation coil wound to the rotating shaft and the length of the excitation coil satisfies the following relation:

$$1.0 \le L1/L4 \le 1.1 \tag{3}$$

where L1 is the length of the stator core; L4 is the length of the excitation coil.

In some embodiments, each of the pole claws has a root and a tip and the radial thicknesses of the tip and root of each of the pole claws satisfy the following relation:

$$0.05 \le H1/H2 \le 0.4 \tag{4}$$

where L1 is the length of the stator core; L4 is the length of the excitation coil.

In some embodiments, the radial thicknesses of the tip and root of each of the pole claws satisfy the following relation:

$$H1/H2 \in (0.05, 0.1) \cup (0.25, 0.4) \tag{5}$$

For the rotating electrical machine provided by the embodiments of the present application, the harmonic reluctance is changed by providing a chamfer on the radial outer surface of the magnetic poles of the rotor and allowing the chamfer to at least partially overlap with the stator core in the rotating shaft direction of the rotor, which reduces the resultant air gap field of the motor and thus the electromagnetic force of the motor, achieving the objective of effectively reducing electromagnetic noise without any effect on the overall structure of the motor and improving user experience.

Additionally, in an embodiment of the present application, the air gap distance at two ends of the motor is increased by providing a chamfer on the radial outer surface of the magnetic poles to change the radial outer surface of the rotor and allowing the chamfer to at least partially overlap with the stator core in the rotating shaft direction of the rotor, which reduces the magnetic permeance of the corresponding part, ultimately changing the spatial distribution of the magnetic permeance of the motor air gap part. According to the electromagnetic field simulation results, the rotating electrical machine provided by this embodiment can suppress higher harmonics of the magnetic permeance of the motor so that the radial flux density of the motor is reduced under the same stator magnetomotive force, which effectively reduces the high order amplitude of the radial electromagnetic force of the motor, ultimately achieving the noise reduction effect. In addition, in an embodiment of the present application, the ratio of the stator core length to the excitation coil length is changed by changing the stator core length and the effective length of the wire in the winding in the event that the excitation coil parameters are not changed. The reduction in the stator winding wire length causes a reduced wire resistance value and thus an increased motor output current, achieving the objective of improving the motor performance. Moreover, this reduces the amount of the core material and the stator winding copper wire, the material cost and the motor weight.

DETAILED DESCRIPTION OF THE INVENTION

The present invention is further described below in detail by referring to the accompanying drawings and embodiments. It should be understood that particular embodiments described here are used only to explain the present invention rather than restrict it. It is also important to note that for the convenience of description, the accompanying drawings show only the part related to the present invention instead of the entire structure.

Figure 1:
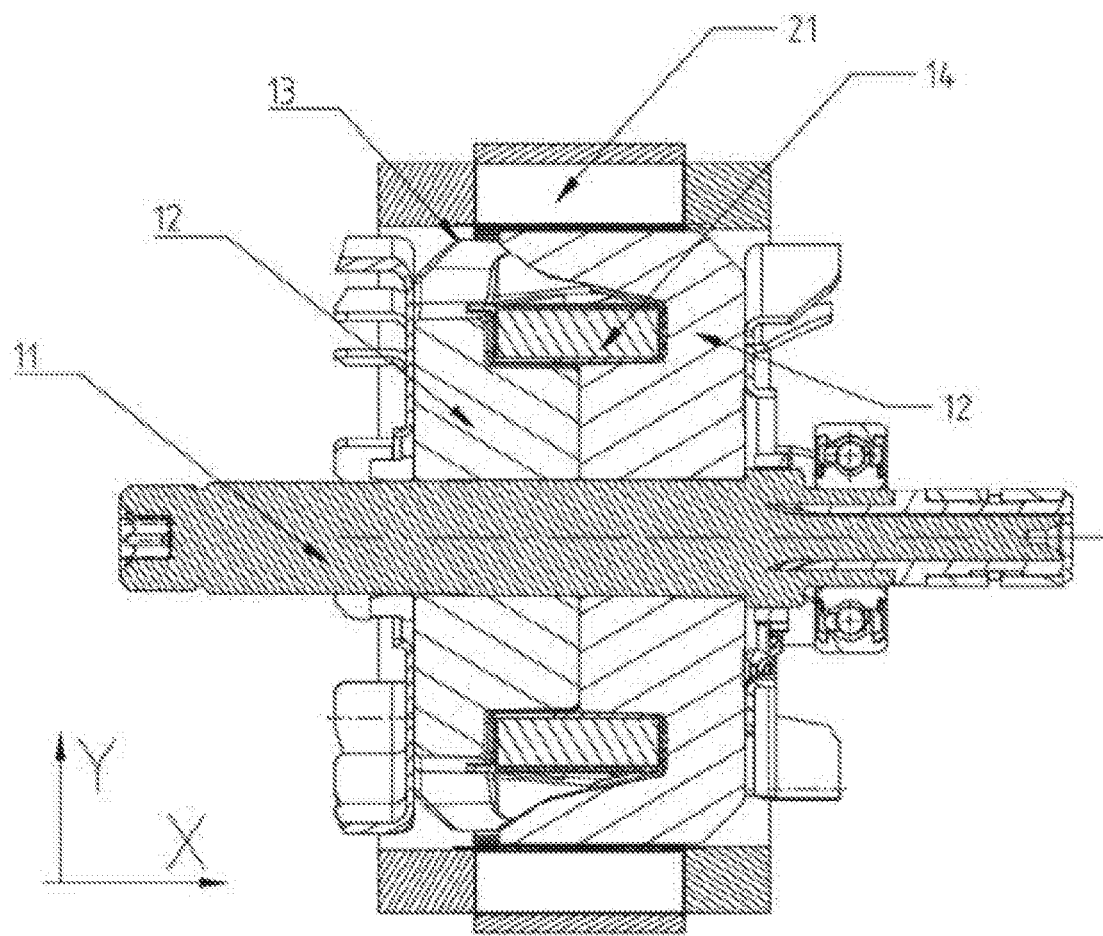
FIG. 1 is a sectional view of a rotating electrical machine provided by an embodiment of the present invention.

FIG. 1 is a sectional view of a rotating electrical machine provided by an embodiment of the present invention. The rotating electrical machine provided by this embodiment can be applied to an electric vehicle as its drive motor. By referring to FIG. 1, the rotating electrical machine comprises a stator and a rotor;

the rotor comprises a rotating shaft 11 and magnetic poles 12 fixed to the rotating shaft 11, a chamfer 13 being provided on the radial outer surface of at least one of the magnetic poles 12;

the stator comprises a stator core 21, the stator core 21 being located on one side of the magnetic poles 12 far from the rotating shaft 11. In an embodiment, the chamfer 13 overlaps with the stator core 21 in the axial direction of the rotor.

Specifically, the axial direction of the rotor is the extension direction of the rotating shaft 11 and corresponds to the X direction shown in FIG. 1; the radial direction of the rotor is perpendicular to the axial direction of the rotor and corresponds to the Y direction shown in FIG. 1.

A plurality of equally spaced tooth sockets of the same shape are provided in the stator core 21. The stator further comprises a stator winding which is wound in the tooth sockets. In a three-phase or multi-phase motor, output is achieved by configuring three or more different stator windings.

The magnetic permeance distribution is changed by providing a chamfer 13 on the radial outer surface of the magnetic poles 12 and allowing the chamfer 13 to at least partially overlap with the stator core 21 in the rotating shaft direction of the rotor, which changes the flux density distribution, ultimately reducing the electromagnetic force. Therefore, higher harmonics generated by the motor during its normal operation are reduced so that the motor vibration and thus the motor noise are reduced during the operation, achieving the noise reduction effect.

The principle according to which the rotor structure of this embodiment can achieve noise reduction is further described below.

The primary cause for electromagnetic noise generated by the motor is the radial component of the air gap field applied to the stator core 21, which propagates outward through the magnetic yoke to cause the vibration and deformation of the stator core 21. The secondary cause is the tangential component of the air gap field, which is opposite to the electromagnetic torque and causes the deformation and vibration of the core magnetic yoke.

Therefore, to reduce electromagnetic noise, the electromagnetic force must be reduced to decrease the vibration and deformation of the stator core 21 and the core magnetic yoke.

According to the principle formula of the electromagnetic force:

$$F_r(\theta, t) = \frac{B_r^2(\theta, t)}{2\mu_o} \tag{6}$$

where $F_r$ is the electromagnetic force and $B_r$ is the resultant air gap field.

It can be seen that when the resultant air gap field is reduced, the electromagnetic force is reduced accordingly. Therefore, the electromagnetic force can be reduced by changing the resultant field.

When the chamfer 13 overlaps with the stator core 21 in the axial direction of the rotor, the magnetic permeance distribution of the motor is changed and the resultant air gap field of the motor is reduced. Specifically:

According to the principle formula of the resultant air gap field:

$$B_r(\theta,t,z)=[F_s(\theta,t)+F_f(\theta,t,z)]\cdot\Lambda(\theta,t,z) \tag{7}$$

where $F_s(\theta, t)$ is the stator magnetomotive force, $F_f(\theta, t, z)$ is the rotor magnetomotive force, and $\Lambda(\theta, t, z)$ is the magnetic permeance.

It can be seen from Formula (7) that changing the magnetic permeance distribution can affect the flux density in the event that the effect of the stator magnetomotive force and the rotor magnetomotive force on the flux density is definite. Therefore, the flux density $B_r$ can be changed by changing the magnetic permeance $\Lambda(\theta, t, z)$.

In this embodiment, the air gap distance at two ends of the motor is increased by providing a chamfer 13 on the radial outer surface of the magnetic poles 12 to change the radial outer surface of the rotor and allowing the chamfer 13 to at least partially overlap with the stator core 21 in the rotating shaft direction of the rotor, which reduces the magnetic permeance of the corresponding part, ultimately changing the spatial distribution of the magnetic permeance of the motor air gap part. According to the electromagnetic field simulation results, the rotating electrical machine provided by this embodiment can suppress higher harmonics of the magnetic permeance of the motor and under the same stator magnetomotive force, reduce the radial flux density of the motor, which effectively reduces the high order amplitude of the radial electromagnetic force of the motor, ultimately achieving the noise reduction effect.

Additionally, in this embodiment, the chamfer 13 is provided on the radial outer surface of the pole claws, so the area of the outer surface of the pole claws is reduced. When the area of the radial outer surface is reduced to a certain degree, the average air gap is increased so that the total reluctance rises, reducing the motor output. To solve this problem, the effective flux is increased by changing the length ratio of the stator core 21 to the excitation coil 14 in this embodiment, which improves the motor output.

For the rotating electrical machine provided by the embodiments of the present invention, the harmonic reluctance is changed by providing a chamfer on the radial outer surface of the magnetic poles of the rotor and allowing the chamfer to at least partially overlap with the stator core in the rotating shaft direction of the rotor without changing the modality of the stator and the rotor, which reduces the resultant air gap field of the motor and thus the electromagnetic force of the motor, achieving the objective of reducing electromagnetic noise and improving user experience. In addition, the radial outer surface of the magnetic poles is changed by providing a chamfer, which reduces the rotary inertia of the rotor and thus the rotor weight, helping improve the startup and braking performance of the motor.

Figure 2:
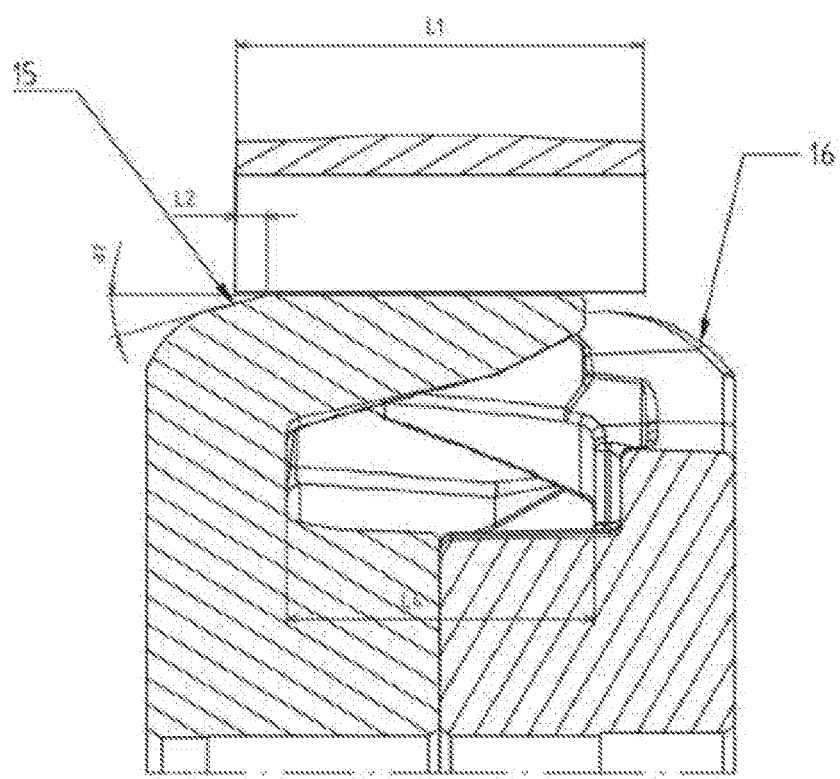
FIG. 2 is a sectional view of the rotating electrical machine shown in FIG. 1 from another perspective.

In one embodiment, FIG. 2 is a sectional view of the rotating electrical machine shown in FIG. 1 from another perspective. Refer to FIG. 2 on the basis of the above-mentioned embodiment. The magnetic poles 12 comprise at least one pole claw, a chamfering part being provided on the outer surface of the at least one pole claw, the chamfering part forming the at least one chamfer 13.

Specifically, the pole claws and the magnetic poles 12 use the one-piece setup. The pole claws comprise a root and a tip. The root is formed of axial bulging of the edge of the magnetic poles 12 and axially extends in a reducing manner to form the tip.

In this embodiment, by providing a chamfering part on the outer surface of the pole claws, the chamfering part forms a chamfer 13. Specifically, the chamfering part extends from the root towards the tip at a certain angle to form a chamfer 13 so that the formed chamfer 13 partially overlaps with the stator core 21 in the axial direction.

In one embodiment, the number of chamfering parts arranged on a corresponding pole claw is one or two so that the corresponding pole claw has one or two chamfers 13.

In an embodiment, at least one pole claw has one chamfer 13, the one chamfer 13 being a first chamfer 15, the first chamfer 15 being located at the root of the pole claw.

Figure 3:
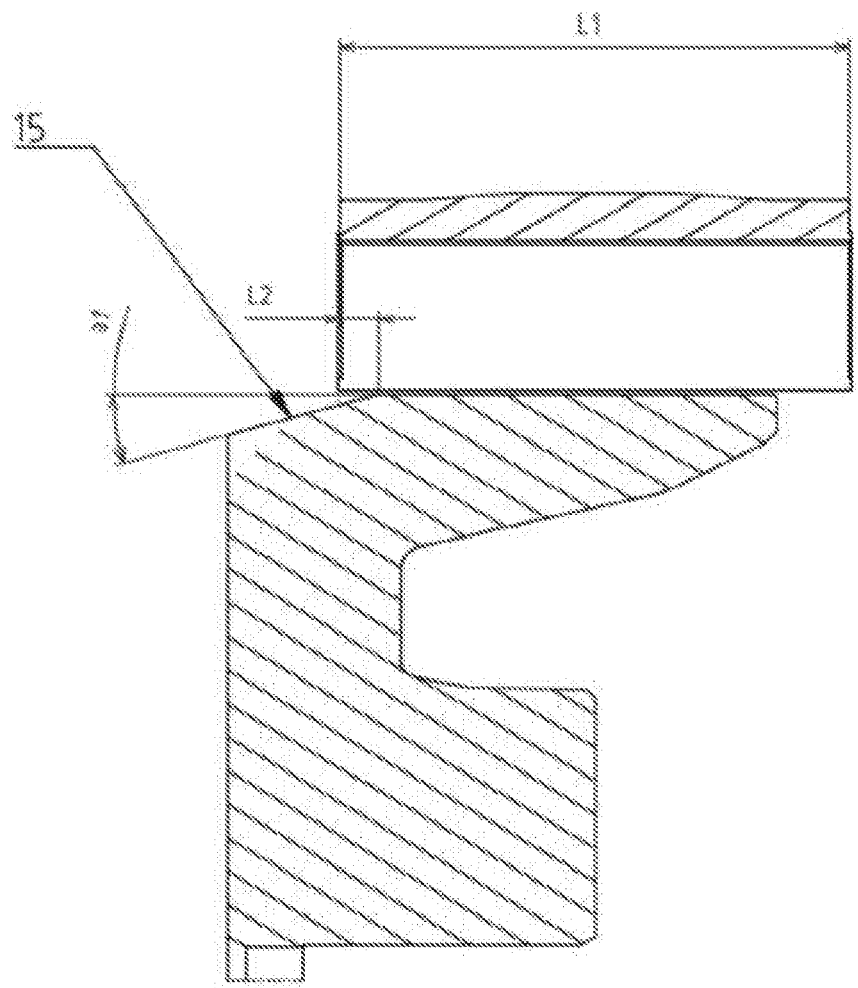
FIG. 3 is a sectional view of another rotating electrical machine provided by an embodiment of the present invention.

FIG. 3 is a sectional view of another rotating electrical machine provided by an embodiment of the present invention. Referring to FIG. 3, the number of chamfering parts arranged on a corresponding pole claw is one. The one chamfering part forms at the root of the pole claw and extends in the tip direction of the pole claw to form a first chamfer 15.

The quantity arranged on a corresponding pole claw is one. The one chamfering part forms at the root of the pole claw and extends in the tip direction of the pole claw to form a first chamfer 15.

It is important to note that the extension end of the chamfering part may be located at the tip or middle of the pole claw. The position of the extension end of the chamfering part needs to be determined according to the motor performance requirements from two dimensions including the included angle between the chamfering part and the stator core and the overlapping length L2 of the chamfering part with the stator core 21 in the axial direction.

In another embodiment, at least one pole claw has two chamfers which are respectively a first chamfer 15 and a second chamfer 16; wherein the second chamfer 16 is located at the root of the pole claw;

the first chamfer 15 is located at the middle or tip of the pole claw, and said first chamfer 15 overlaps with the stator core 21 in the axial direction of the rotor.

Continuing to refer to FIG. 2, the number of chamfering parts arranged on a corresponding pole claw is two, wherein a chamfering part located at the root forms a second chamfer 16; the other chamfering part is adjacent to this chamfering part and forms a first chamfer 15.

Under this condition, it is necessary to at least ensure that the first chamfer 15 overlaps with the stator core 21 in the axial direction. For example, one end of the chamfering part which forms the second chamfer 16 may extend to the middle of the pole claw and the chamfering part which forms the first chamfer 15 extends from the middle towards the tip to achieve the overlapping of the first chamfer 15 with the stator core 21 in the axial direction.

Of course, the second chamfer 16 may also overlap with the stator core 21 in the axial direction, on condition that both the first chamfer 15 and second chamfer 16 overlap with the stator core 21 in the axial direction. In the event that consideration is given to the motor stability, the respective angle of the chamfering parts forming the two chamfers and the overlapping length L2 with the stator core 21 in the axial direction can be respectively adjusted by referring to the simulation test so that the motor has the optimal noise reduction effect.

Figure 4:
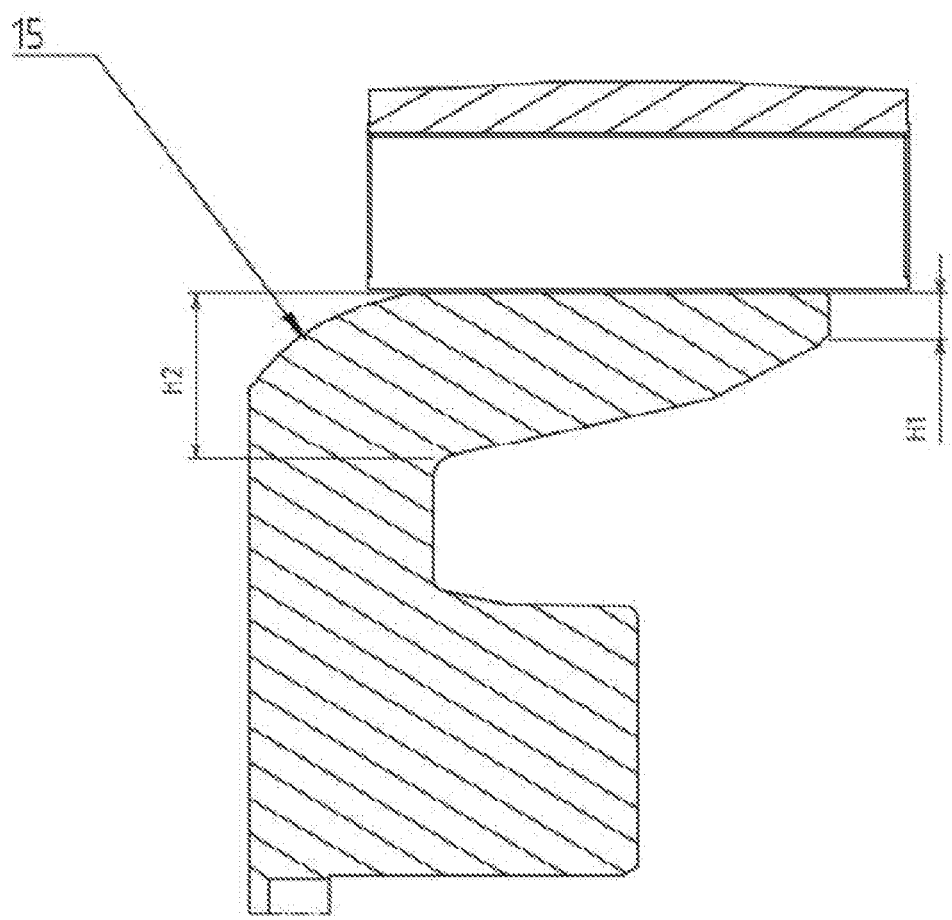
FIG. 4 is a sectional view of yet another rotating electrical machine provided by an embodiment of the present invention.

In one embodiment, FIG. 4 is a sectional view of another rotating electrical machine provided by an embodiment of the present invention. Refer to FIGS. 4 and 3 on the basis of the above-mentioned embodiment. The chamfering part is a cambered surface or a smooth surface with a preset angle. On this basis, when one pole claw has two chamfers, one chamfering part may be a cambered surface and the other chamfering part may be a smooth surface; alternatively, the two chamfering parts are cambered surfaces or smooth surfaces.

In one embodiment, continue to refer to FIG. 2 on the basis of the above-mentioned embodiment. The first chamfer 15 joins the second chamfer 16; alternatively, the first chamfer 15 and the second chamfer 16 have a cambered transition part.

Specifically, the first chamfer 15 joining the second chamfer 16 means that the first chamfer 15 and the second chamfer 16 have a common end. This case, for example, may be as follows: After the processing of the second chamfer 16 is finished, directly process the other chamfering part at the end of the second chamfer 16 according to the other angle to form the first chamfer 15.

In one embodiment, when the first chamfer 15 and the second chamfer 16 have a transition part, process the transition part into a camber so that the first chamfer 15 gradually transits to the second chamfer 16.

In one embodiment, continue to refer to FIG. 1 on the basis of the above-mentioned embodiment. The number of the magnetic poles 12 of this rotating electrical machine is two;

the chamfer 13 is provided on all the pole claws of the two magnetic poles; alternatively, the chamfer 13 is provided on all the pole claws of the one magnetic pole 12; alternatively, the chamfer 13 is provided on some of the respective pole claws of the two magnetic poles; alternatively, the chamfer 13 is provided on some of the pole claws of the one magnetic pole 12.

Specifically, the two magnetic poles are respectively a front pole and a rear pole which are oppositely provided at the two ends of the magnetic yoke to form a pair of magnetic poles. On this basis, the bulging part of the edge of each magnetic pole 12 extends towards the opposite magnetic pole 12 to form pole claws.

In one embodiment, a plurality of pole claws are provided on a pair of magnetic poles. The plurality of pole claws are evenly provided circumferentially at the end of respective magnetic poles 12. Therefore, heat generated by the rotor during the normal operation of the motor can be promptly removed through the gap between the circumferentially distributed pole claws, improving the heat dissipation of the motor and helping the motor to operate stably.

When pole claws are provided on a pair of magnetic poles, the pole claws of the pair of magnetic poles are provided in a staggered manner. In the event that the excitation coil 14 of the rotor provides excitation current, an NS field is generated between the pole claws and the pair of magnetic poles forms a magnetic circuit with the stator core 21 through the pole claws, which is used to perform magnetic permeance and heat dissipation.

In actual use, to improve the operation stability of the motor, the pair of magnetic poles is symmetrically provided, i.e. the chamfer 13 is provided on all the pole claws of the pair of magnetic poles.

In one embodiment, on the basis of the above-mentioned embodiment, the overlapping length L2 of the first chamfer 15 with the stator core 21 in the axial direction satisfies the following relation to achieve the optimal noise reduction effect:

$$0.01 \le L2/L1 \le 0.3 \quad (1)$$

where L1 is the length of the stator core; L2 is the overlapping length of the first chamfer with the stator core.

Specifically, the position and length of the stator core 21 are fixed, so the overlapping length L2 of the chamfer 13 with the stator core 21 in the axial direction can be adjusted by adjusting the length of the chamfering part forming the chamfer 13 in the event that the modality of the motor is fixed.

In addition, in the event that the overlapping length L2 of the chamfer 13 with the stator core 21 in the axial direction is fixed, the change in the included angle between the chamfer 13 and the stator core 21 also affects the noise reduction effect of the motor according to the simulation results. In an embodiment, the included angle α1 between the chamfer 13 and the stator core 21 is determined according to the following relation: A preset included angle exists between the first chamfer 15 and the stator core 21 and satisfies the following relation:

$$1° \le α1 \le 30° \quad (2)$$

where α1 is the preset included angle between the first chamfer and the stator core.

Figure 6:
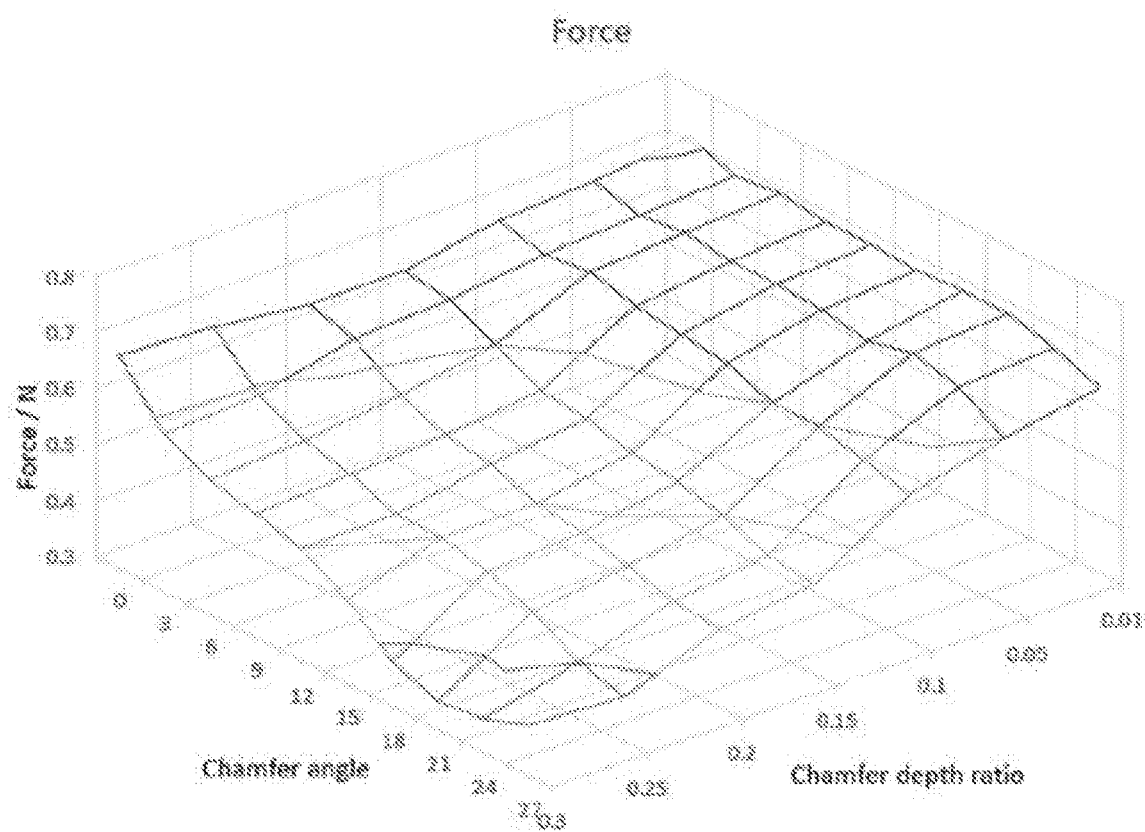
FIG. 6 is a graph of the variation of electromagnetic noise with the overlapping length of the chamfer with the stator core and the preset included angle between the chamfer and the stator core of the motor provided by an embodiment of the present invention.

FIG. 6 is a graph of the variation of electromagnetic noise with the overlapping length of the chamfer with the stator core and the preset included angle between the chamfer and the stator core of the motor provided by an embodiment of the present invention. As can be seen from FIG. 6, when the included angle between the chamfer 13 and the stator core 21 increases in the range of 1° to 30°, the electromagnetic force gradually decreases; when the overlapping length L2 of the chamfer 13 with the stator core 21 in the axial direction increases in the range of 0.01 to 0.3, the electromagnetic force gradually decreases. In addition, the overall electromagnetic force is small within the range of this angle and this overlapping length so that the motor has the optimal noise reduction effect.

In this embodiment, when the overlapping length L2 of the chamfer 13 with the stator core 21 in the axial direction satisfies Formula (1) and the included angle between the chamfer 13 and the stator core 21 satisfies the range of Formula (2), higher harmonics of the magnetic permeance of the motor are effectively suppressed by quantifying the overlapping length L2 of the chamfer 13 with the stator core 21 and the preset included angle between the chamfer 13 and the stator core 21, which effectively reduces the high order amplitude of the radial electromagnetic force of the motor under the same stator magnetomotive force, achieving the optimal noise reduction effect.

In this embodiment, the chamfer 13 is provided on the radial outer surface of the pole claws, so the area of the outer surface of the pole claws is reduced. When the area of the radial outer surface is reduced to a certain degree, the average air gap is increased so that the total reluctance rises, reducing the motor output. To solve this problem, the effective flux is increased by changing the length ratio of the stator core 21 to the excitation coil 14 in this embodiment, which improves the motor output. The method of improving the motor output provided by this embodiment will be further described below by referring to the accompanying drawings.

Optionally, continue to refer to FIGS. 1 and 2 on the basis of the above-mentioned embodiment. The rotor further comprises an excitation coil 14 wound to the rotating shaft 11 and the length of the excitation coil 14 satisfies the following relation:

$$1.0 \le L1/L4 \le 1.1 \quad (3)$$

where L1 is the length of the stator core; L4 is the length of the excitation coil.

Specifically, the excitation coil 14 of the rotor provides an excitation current to form a field between the pole claws of the rotor.

The stator winding generates an alternating current in the alternating field of the rotor.

L1 is the length of the stator core 21 and is consistent with the effective length of the wire in the stator winding. This effective length participates in cutting the magnetic force line to generate a magnetomotive force E. According to the calculation formula of the wire resistance:

$$R = \rho * \frac{L}{S} \quad (8)$$

where R is the wire resistance; ρ is the wire resistivity; L is the wire length; S is the sectional area of the wire.

It can be seen that the shorter wire has a smaller resistance value in the event that the sectional area of the wire is definite. According to the calculation formula of the generating current:

$$i = \frac{E}{R} \quad (9)$$

where E is the magnetomotive force; R is the wire resistance.

It can be seen that the smaller wire resistance causes a larger generating current, so increasing the effective length of the wire in the stator winding can improve the output performance of the motor.

Because the size of the magnetomotive force is related to the length of the excitation coil 14, comprehensive consideration needs to be given to the length of the excitation coil 14 and the effective length of the wire in the stator winding so that the motor has an optimal output.

Figure 5:
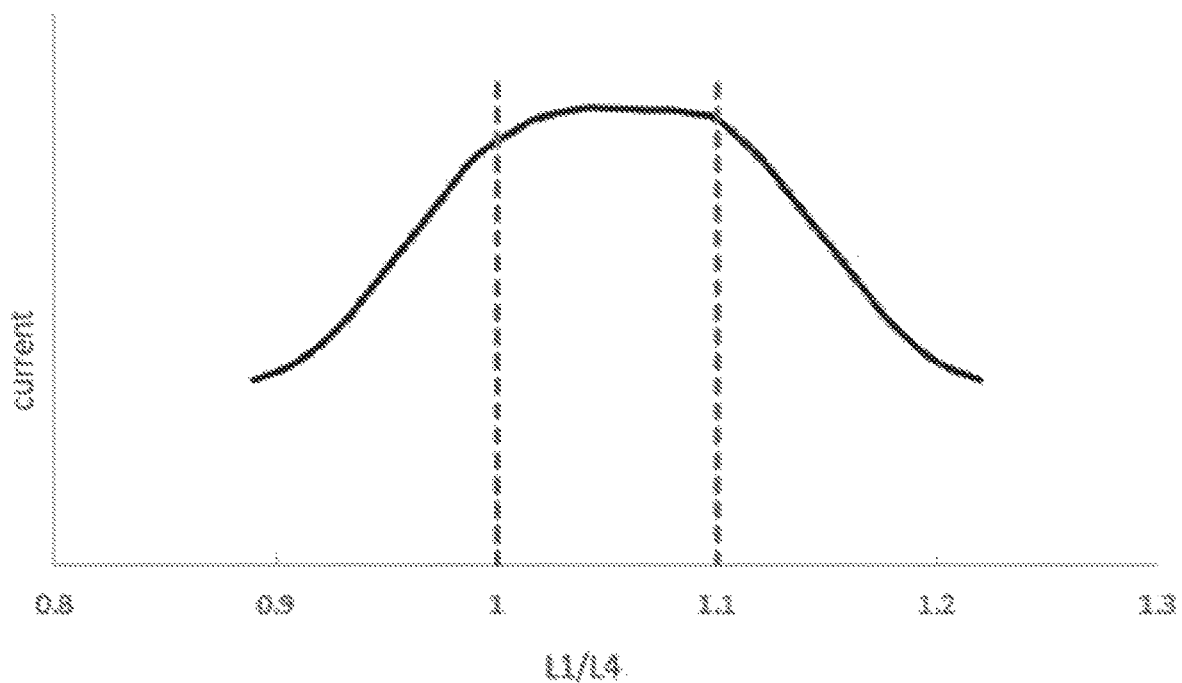
FIG. 5 is a graph of the variation of the output current with the length ratio of the excitation coil to the stator core provided by an embodiment of the present invention.

In one embodiment, FIG. 5 is a graph of the variation of the output current with the length ratio of the excitation coil to the stator core provided by an embodiment of the present invention. As can be seen from FIG. 5, when the ratio of the length of the stator core 21 to the length of the excitation coil 14 is smaller than the first threshold value (corresponding to 1.0 in the figure), the output current of the motor continuously increases with the increase in the ratio of the length of the stator core 21 to the length of the excitation coil 14; when the ratio of the length of the stator core 21 to the length of the excitation coil 14 increases to the second threshold (corresponding to 1.1 in the figure), the output current of the motor decreases. When the ratio of the length of the stator core to the length of the excitation coil 14 is set according to the range of Formula (3), the motor has an optimal output current value according to the simulation test.

In this embodiment, the ratio of the length of the stator core 21 to the length of the excitation coil 14 is changed by changing the length of the stator core 21 and the effective length of the wire in the winding in the event that the parameters of the excitation coil 14 are not changed. The reduction in the stator winding wire length causes a reduced wire resistance value and thus an increased motor output current, achieving the objective of improving the motor performance. Moreover, this reduces the amount of the core material and the stator winding copper wire, the material cost and the motor weight.

In one embodiment, on the basis of the above-mentioned embodiment, the ratio of the tip radial thickness of the pole claws to the root radial thickness of the pole claws may be changed to optimize the electromagnetic circuit and increase the effective flux, improving the motor output value.

Specifically, continue to refer to FIG. 4. In the figure, H1 is the tip radial thickness of the pole claws; H2 is the root radial thickness of the pole claws. The side tangential flux of the reducing pole claws of the rotor, i.e. the tangential leakage flux, directly affects the induced electromotive force of the motor and the tangential leakage flux between two adjacent pole claws is related to the side surface area. If the side surface area of the pole claws of the rotor is too large, a large amount of leakage flux exists between the side surfaces of two adjacent pole claws, which reduces the effective flux and the motor output. The side surface area of the pole claws of the rotor is related to the tip radial thickness H1 and root radial thickness H2 of the pole claws. In addition, the side surface dimensions of the pole claws of the rotor are related to the strength of the pole claws of the rotor and the pole claws of the rotor need to withstand high-speed operation mode. Therefore, the side surface dimensions, tip radial thickness H1 and root radial thickness H2 of the pole claws must be within a reasonable range, the tangential leakage flux must be reduced and the strength must be ensured. When the ratio of the tip radial thickness H1 to the root radial thickness H2 of the pole claws satisfies the following relation, the range of the side surface dimensions of the pole claws may reduce the tangential leakage flux, ensure the strength and increase the effective flux, improving the motor output.

$$0.05 \leq H1/H2 \leq 0.4 \quad (4)$$

In one embodiment of the present invention, the ratio of the tip radial thickness H1 to the root radial thickness H2 of the pole claws is specifically within the following range:

$$H1/H2 \in (0.05, 0.1) \cup (0.25, 0.4)$$

By adjusting the ratio of the tip radial thickness H1 to the root radial thickness H2 of the pole claws of the rotor, this embodiment effectively improves the electromagnetic circuit, reduces the leakage flux and increases the effective flux, improving the motor output.

It is important to note that the above-mentioned description is only the preferred embodiments of the present invention and the applied technical principle. Those skilled in the art should understand that the present invention is not limited to the specific embodiments described here. Those skilled in the art can make various significant changes, readjustments and replacements without deviating from the scope of protection of the present invention. Therefore, the present invention is described in detail through the above-mentioned embodiments, but is not limited to the above-mentioned embodiments. Additional other equivalent embodiments may be further included without deviating from the idea of the present invention and the scope of the present invention is determined by the scope of the appended claims.

What is claimed is:

1. A rotating electrical machine, wherein, the rotating electrical machine comprises a stator and a rotor;

the rotor comprises a rotating shaft and magnetic poles fixed to the rotating shaft, a chamfer being provided on a radial outer surface of at least one of the magnetic poles;

the stator comprises a stator core, the stator core being located on one side of the magnetic poles far from the rotating shaft, the chamfer overlapping with the stator core in an axial direction of the rotor;

the magnetic poles comprise at least one pole claw, a chamfering part being provided on the outer surface of the at least one pole claw, the chamfering part forming the at least one chamfer;

the at least one pole claw has one chamfer, the one chamfer being a first chamfer, the first chamfer being located at the root of the pole claw;

the overlapping length of the first chamfer with the stator core in the axial direction satisfies the following relation:

$$0.01 \leq L2/L1 \leq 0.3 \quad (1)$$

where L1 is the length of the stator core; L2 is the overlapping length of the first chamfer with the stator core.

2. The rotating electrical machine according to claim 1, wherein the chamfering part is a cambered surface or a smooth surface with a preset angle.

3. The rotating electrical machine according to claim 1, wherein the number of the magnetic poles is two;

the chamfer is provided on all the pole claws of the two magnetic poles; or, the chamfer is provided on all the pole claws of the one magnetic pole; or, the chamfer is provided on some of the respective pole claws of the two magnetic poles; or, the chamfer is provided on some of the pole claws of the one magnetic pole.

4. The rotating electrical machine according to claim 1, wherein
a preset included angle exists between the first chamfer and the stator core and satisfies the following relation:

$$1° \leq \alpha 1 \leq 30° \tag{2}$$

where $\alpha 1$ is the preset included angle between the first chamfer and the stator core.

5. The rotating electrical machine according to claim 1, wherein
the rotor further comprises an excitation coil wound to the rotating shaft and the length of the excitation coil satisfies the following relation:

$$1.0 \leq L1/L4 \leq 1.1 \tag{3}$$

where L1 is the length of the stator core; L4 is the length of the excitation coil.

6. The rotating electrical machine according to claim 1, wherein
each of the pole claws has a root and a tip and the radial thicknesses of the tip and root of each of the pole claws satisfy the following relation:

$$0.05 \leq H1/H2 \leq 0.4 \tag{4}$$

where H1 is the tip radial thickness of the pole claws; H2 is the root radial thickness of the pole claws.

7. The rotating electrical machine according to claim 6, wherein
the radial thicknesses of the tip and root of each of the pole claws satisfy the following relation:

$$H1/H2 \in (0.05, 0.1) \cup (0.25, 0.4). \tag{5}$$

8. The rotating electrical machine according to claim 2, wherein
each of the pole claws has a root and a tip and the radial thicknesses of the tip and root of each of the pole claws satisfy the following relation:

$$0.05 \leq H1/H2 \leq 0.4 \tag{4}$$

where H1 is the tip radial thickness of the pole claws; H2 is the root radial thickness of the pole claws.

9. The rotating electrical machine according to claim 3, wherein
each of the pole claws has a root and a tip and the radial thicknesses of the tip and root of each of the pole claws satisfy the following relation:

$$0.05 \leq H1/H2 \leq 0.4 \tag{4}$$

where H1 is the tip radial thickness of the pole claws; H2 is the root radial thickness of the pole claws.

10. A rotating electrical machine, wherein, the rotating electrical machine comprises a stator and a rotor;
the rotor comprises a rotating shaft and magnetic poles fixed to the rotating shaft, a chamfer being provided on a radial outer surface of at least one of the magnetic poles;
the stator comprises a stator core, the stator core being located on one side of the magnetic poles far from the rotating shaft, the chamfer overlapping with the stator core in an axial direction of the rotor;
the magnetic poles comprise at least one pole claw, a chamfering part being provided on the outer surface of the at least one pole claw, the chamfering part forming the at least one chamfer;
the at least one pole claw has two chamfers which are respectively a first chamfer and a second chamfer; wherein
the second chamfer is located at the root of the pole claw;
the first chamfer is located at the middle or tip of the pole claw and overlaps with the stator core in the axial direction of the rotor;
the overlapping length of the first chamfer with the stator core in the axial direction satisfies the following relation:

$$0.01 \leq L2/L1 \leq 0.3 \tag{1}$$

where L1 is the length of the stator core; L2 is the overlapping length of the first chamfer with the stator core.

11. The rotating electrical machine according to claim 10, wherein
the first chamfer joins the second chamfer; or,
the first chamfer and the second chamfer have a cambered transition part.

12. The rotating electrical machine according to claim 10, wherein
a preset included angle exists between the first chamfer and the stator core and satisfies the following relation:

$$1° \leq \alpha 1 \leq 30° \tag{2}$$

where $\alpha 1$ is the preset included angle between the first chamfer and the stator core.

* * * * *